N. H. BEEBE & W. A. THOMAS.
THRESHING HARVESTER.
APPLICATION FILED SEPT. 25, 1911. RENEWED NOV. 23, 1915.

1,172,665.

Patented Feb. 22, 1916.
5 SHEETS—SHEET 4.

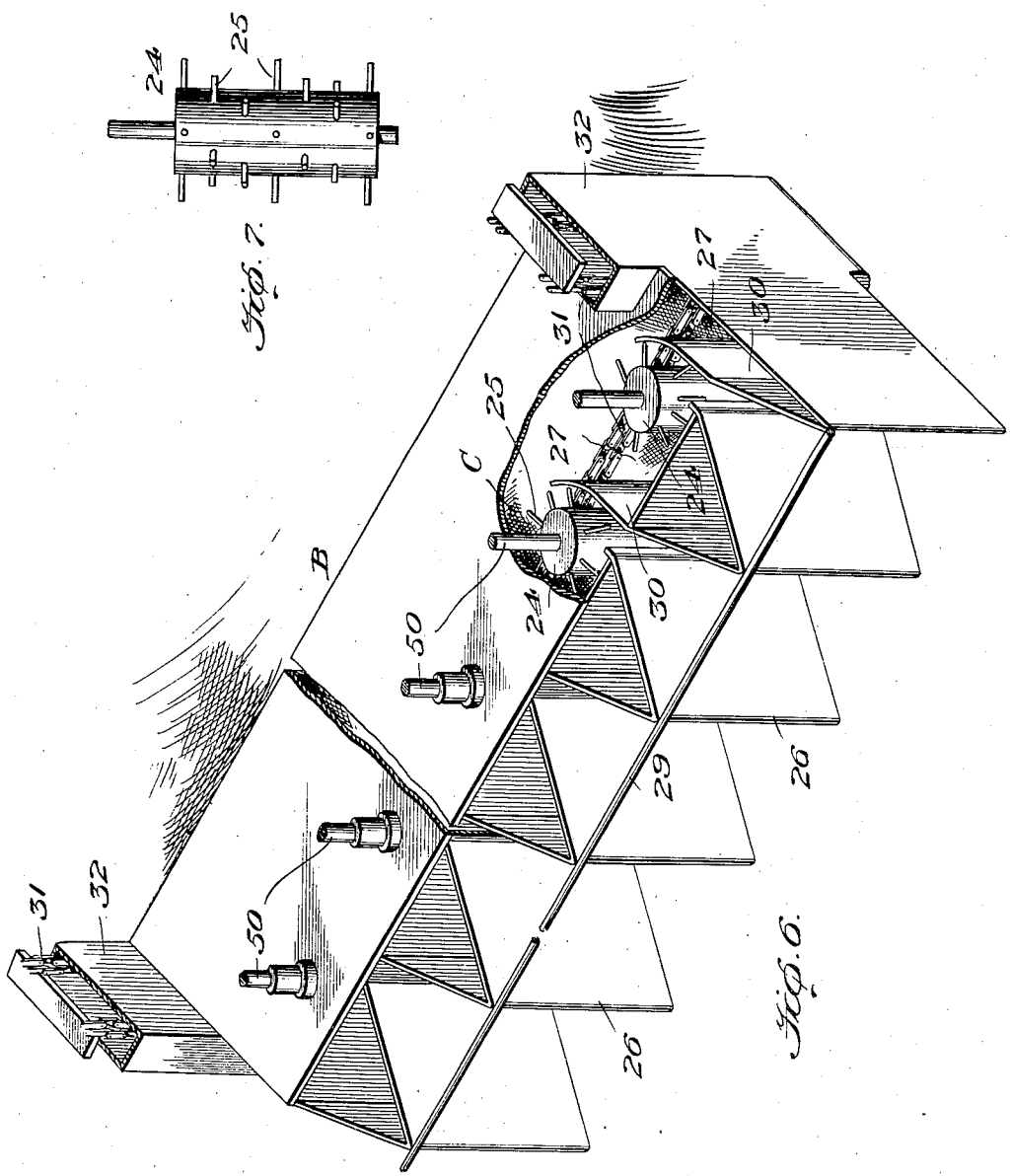

UNITED STATES PATENT OFFICE.

NORMAN H. BEEBE AND WILLIAM A. THOMAS, OF WICHITA, KANSAS, ASSIGNORS TO GLOBE MACHINE COMPANY, OF WICHITA, KANSAS.

THRESHING-HARVESTER.

1,172,665.  Specification of Letters Patent.  Patented Feb. 22, 1916.

Application filed September 25, 1911, Serial No. 651,175. Renewed November 23, 1915. Serial No. 63,140.

*To all whom it may concern:*

Be it known that we, NORMAN H. BEEBE and WILLIAM A. THOMAS, citizens of the United States, residing at Wichita, in the county of Sedgwick and State of Kansas, have invented certain new and useful Improvements in Threshing-Harvesters, of which the following is a specification.

This invention relates to an improvement in threshing harvesters for harvesting grain such as wheat, oats, rye, barley, Kafir corn, etc., without cutting the stalk, or in other words, the grain will be threshed from the heads of the stalk and leave the straw or stalk standing.

The object of the invention is in the provision of means for threshing the grain from the straw or stalk and then conveying the grain to a rethreshing cylinder which more perfectly threshes it by removing any chaff still clinging to the grain after it has passed the primary threshing cylinders, and then separating and cleaning the grain from the chaff, straw and refuse, and causing the straw, chaff and refuse to be discharged from the rethreshing cylinder, and also providing means for conducting the cleaned grain from the rethreshing cylinder to any suitable receptacle.

Figure 1:
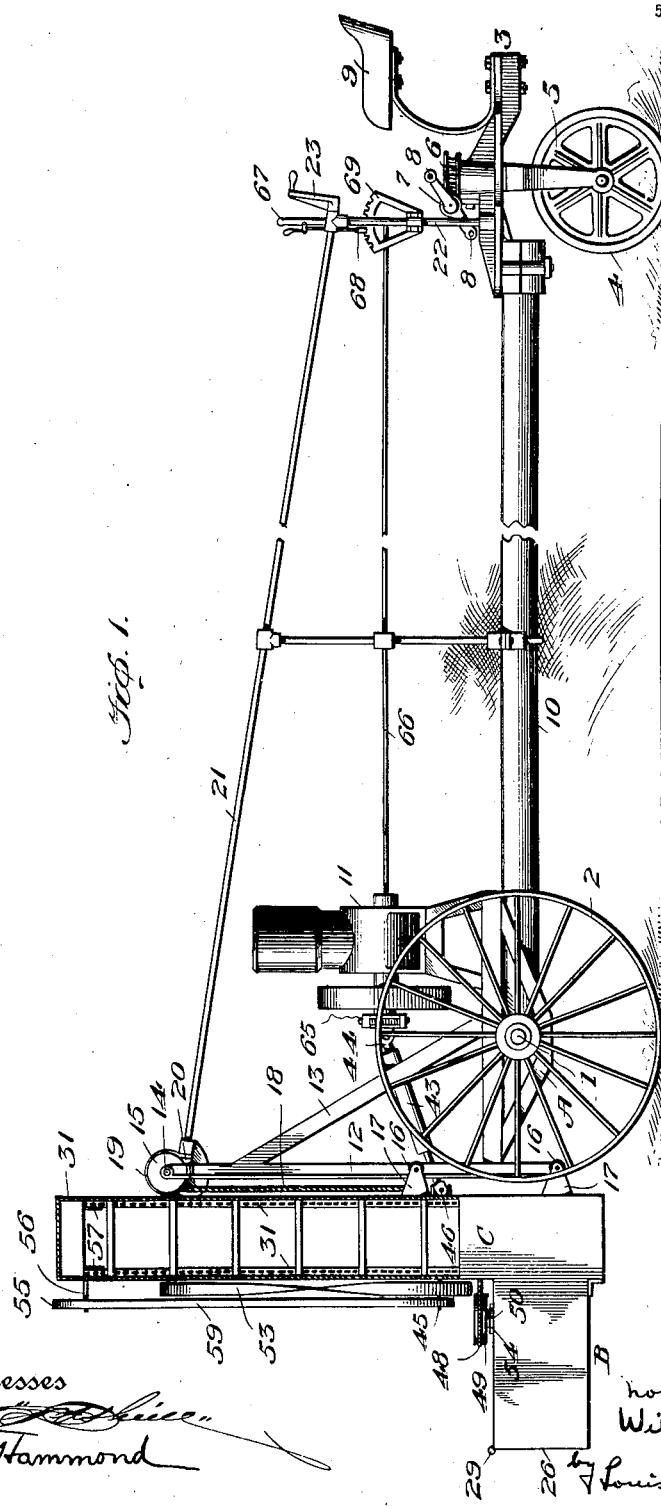
Figure 2:
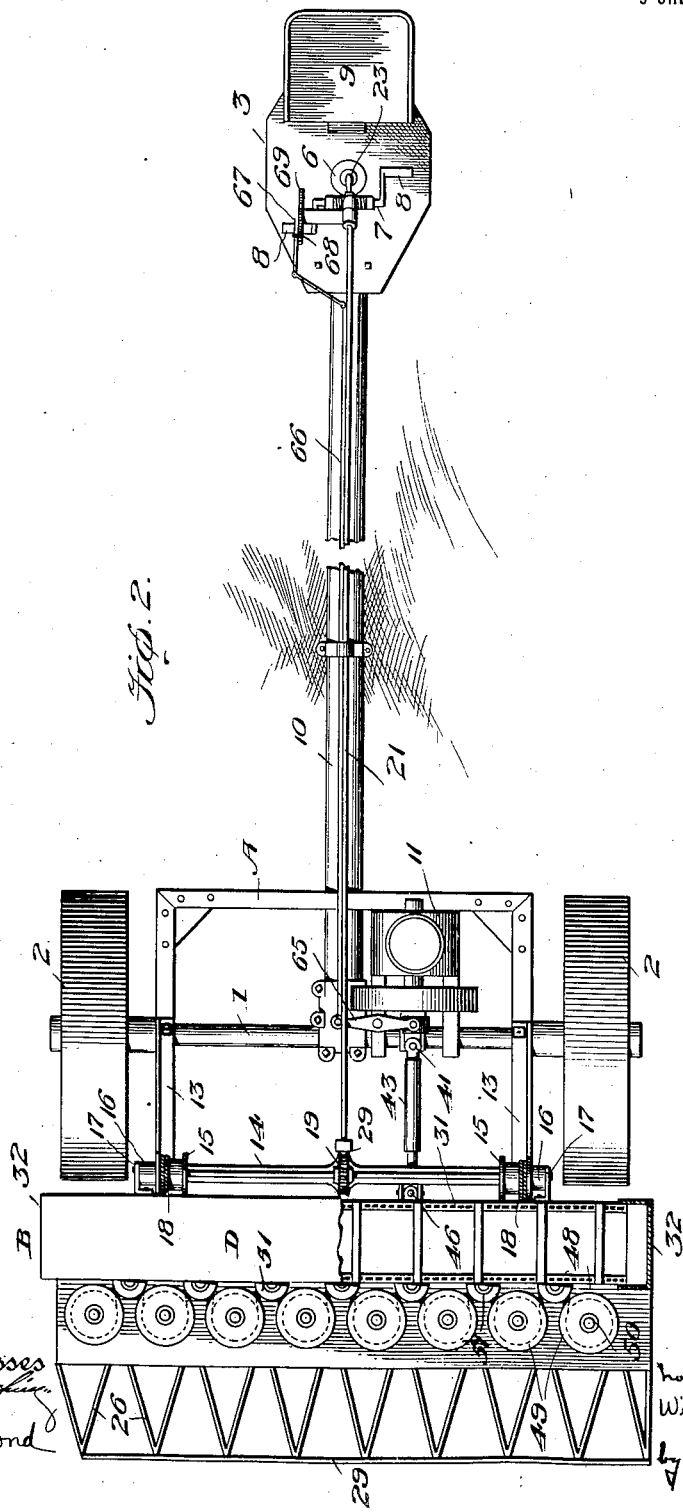
Figure 3:
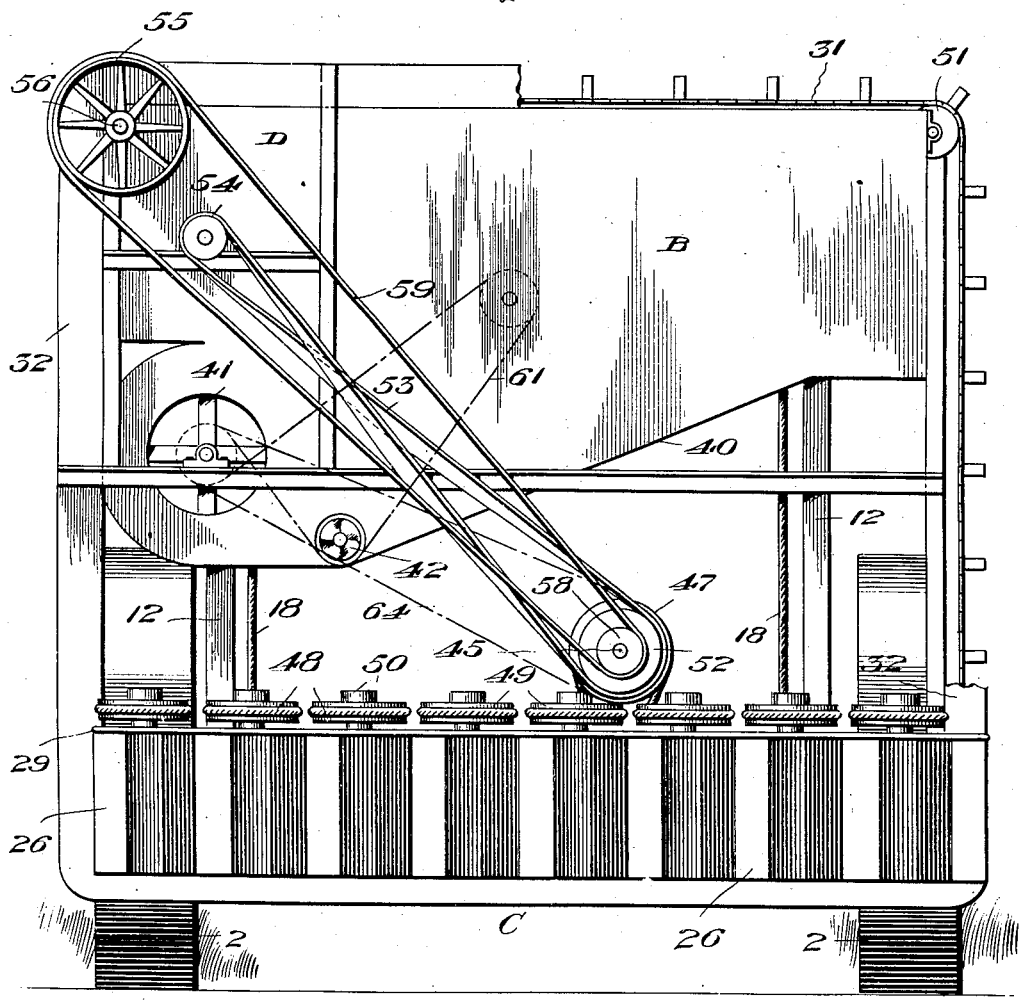
Figure 4:
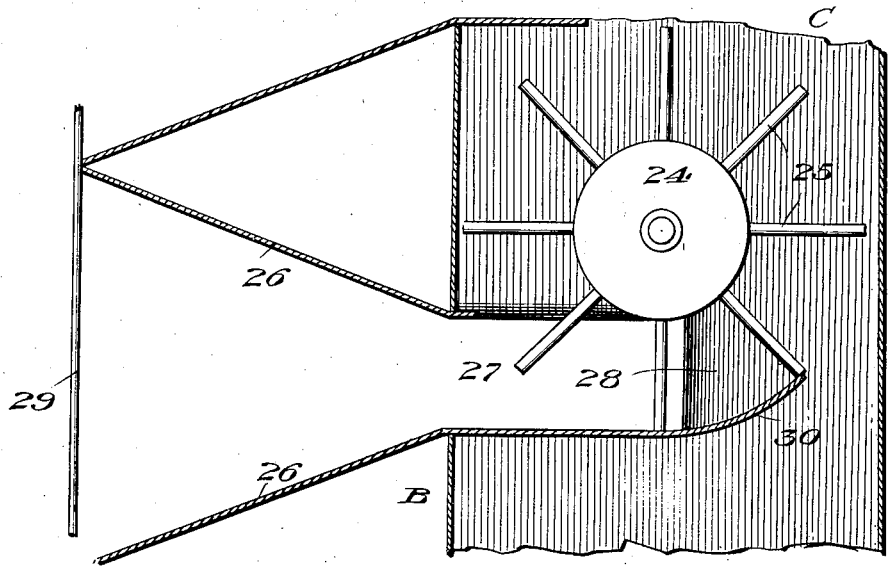
Figure 5:
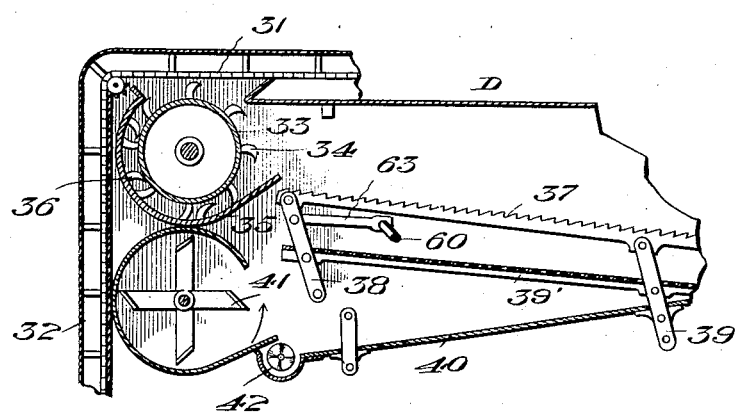

In the accompanying drawings, Figure 1 is a view in side elevation of the machine, with a portion of the casing broken away; Fig. 2 is a top plan view of the thresher with a portion of the casing broken away; Fig. 3 is a front elevation of the thresher with a portion of the casing broken away; Fig. 4 is an enlarged detail sectional view of the casing, showing one of the threshing cylinders; Fig. 5 is a detail sectional view showing the interior of the rethreshing chamber; Fig. 6 is a perspective view of a portion of the casing disclosing a portion of the threshing chamber broken away to show the threshing cylinders; and Fig. 7 is a view in elevation of one of the threshing cylinders.

A, represents the frame of the forward truck, to which an axle 1 is connected, and upon which wheels 2, 2, are rotatably mounted. The frame 3 of the rear truck is provided with a wheel 4 which is connected thereto by a yoke 5, the shank of which yoke is provided with a worm wheel 6. A crank shaft 7 is mounted upon the frame and is provided with a worm gear thereon, which meshes with the worm gear 6, pedals 8 on crank 7 being connected to the shaft whereby the operator can operate the shaft by means of his feet. A seat 9 is mounted upon the frame 3, whereby the operator can operate the crank shaft for guiding the trucks through the field, the two trucks being connected together by means of a reach or beam 10.

Mounted upon the forward truck A is an engine 11 and connected to the forward end of the frame A are vertical angle iron uprights 12, 12, which are braced to the frame by means of braces 13. Journaled at the upper ends of the uprights is a shaft 14, upon which are mounted winding drums 15. The threshing casing B is provided with rollers 16, 16, carried in brackets 17, the rollers being received against the angle iron uprights 12. Ropes or cables 18 are connected to the casing B and to the winding drums 15 for supporting the casing upon the frame A and allowing the casing to be raised and lowered upon the rotation of the shaft, whereby the cables or ropes are wound or unwound on the drums 15. A worm wheel 19 is mounted upon the shaft 14, which meshes with the worm 20, carried by the shaft 21, which is supported by the reach 10 and post 22 on the rear truck frame 3. A crank 23 is connected to the shaft 21 for rotating the shaft for causing the shaft 14 to rotate for raising and lowering the casing B.

Journaled in the lower portion of the casing B are vertical cylinders 24 which are provided with teeth 25 formed spirally upon the outer surface of the cylinder. The forward end of the casing is provided with V-shaped projections 26 forming dividers for separating the stalks or straw so that it will be fed through the openings 27 formed in the forward end or base of the casing, so that the straw will come in contact or be brought into a position so that the fingers or teeth 25 will come in contact with the straw and knock or brush the grain therefrom into the threshing chamber C. The bottom of the casing B of the chamber C is rounded, as at 28, at the end of the opening or slot 27, to prevent the stalks or straws from being broken as they enter the housing or chamber C during the removal of the grain from the stalks or straw. A guard 29 extends along the forward edge of the dividers and the function of this guard rail is to prevent any heavy weeds from passing into the forward openings and damaging the cylinder spikes or fingers 25.

It will be noted that curved partitions or guides 30 are mounted on the bottom of the chamber C for causing the grain to be delivered obliquely into the chamber or housing instead of driving the grain straight back. In this way, the grain is distributed into the housing in such a manner that it can be taken up by the conveyer 31, which travels lengthwise of the chamber and travels upward to the rethreshing chamber D where the grain is discharged for the rethreshing operation.

The chamber D is located above the chamber C, and conduits 32 are provided whereby the endless conveyer 31 travels for carrying the grain from the chamber C to the rethreshing chamber D. A rethreshing cylinder 33 is journaled in the chamber D and is provided with curved teeth 34. The curved or concave bottom 35 is located beneath and along one side of the horizontally journaled cylinder 33, and is provided with curved teeth 36, which extend in an opposite direction to the teeth of the cylinder 33. As the grain is discharged from the conveyer into the chamber D, it will come in contact with the rotating cylinder 33, and the grain will be acted upon by the teeth of the concave bottom and cylinder, whereby all chaff and straw will be broken therefrom and will be discharged onto the straw rack 37. The straw rack is mounted upon levers 38 and 39 which are pivotally connected to the casing B of the chamber D.

The rack 37 is composed of the usual form of slats and located below the rack is a vibrating riddle or screen 39' which is also connected to the levers 38 and 39. After the grain, chaff and straw are discharged from the concave 35, they will be received upon the rack 37, and the chaff and straw to a great extent will be discharged at the lower end of the vibrating rack 37, while the grain and a certain amount of the chaff and dust will be discharged onto the vibrating riddle or screen 39', and eventually fall to the bottom 40 of the chamber D. The fan 41, journaled in the chamber, causes a blast of air to be driven across the bottom 40 and through the screen and rack, so that the chaff, straw and dust is blown from the chamber and the grain will travel down the inclined surface of the bottom 40 to the screw conveyer or auger 42, where it will be discharged from the chamber.

A telescoping shaft 43 is connected to the engine shaft by means of a universal joint 44. A shaft 45 is mounted upon the casing B, to which shaft the shaft 43 is connected by a universal joint 46. A pulley 47 is connected to the shaft 45, and passing around the pulley is a cable 48 which passes around pulleys 49 on the shafts 50 of the cylinders 24, whereby motion is transmitted to the cylinders. Idlers 51 are mounted upon the top of the chamber C intermediate of the pulleys 49 of the cylinders 24, so that the cable 48 will pass around the pulleys of the cylinder, thence around an idler, and thence around the pulley of another cylinder, whereby the several cylinders will all rotate in the same direction. A pulley 52 is mounted upon the shaft 45, around which a belt 53 passes, and thence around the pulley 54 on the shaft of the rethreshing cylinder 33. A pulley 55 is mounted upon the shaft 56, which shaft carries sprocket wheels 57, the sprocket wheels engaging the chains of the belt or conveyer 31, whereby upon the rotation of the pulley the conveyer is caused to move. A pulley 58 is mounted on the shaft 45, and around the pulley 58 and pulley 55 a belt 59 passes for transmitting motion for causing the endless conveyer to travel. A crank shaft 60 mounted on the casing B has connected thereto an end of a lever 63, which lever 63 is connected to the vibrating rack and screen. The crank shaft 60 and the auger or screw conveyer 42, are driven by means of a belt 61 from the shaft of the fan 41, the fan receiving its power by a belt 64 which is driven by the shaft 45.

A clutch lever 65 is pivotally connected to the frame A and engages a clutch on the engine shaft, whereby the engine is controlled. A rod 66 is connected to the lever 65, and is connected to a lever 67, which is provided with a ratchet 68 for engaging the ratchet segment 69 for controlling the movement or operation of the engine.

From the foregoing it will be seen that by this invention we have provided a series of vertical cylinders for threshing grain from the straw or stalk, as it stands in the field, and that the cylinders are capable of being raised and lowered to suit the different heights of the standing grain, and further, in the provision of an endless conveyer for conveying the threshed grain to a rethreshing cylinder, where the grain is cleaned and discharged onto a cleaning device for the removal of the chaff and other matter from the grain, and separating them by the vibration of the cleaning device, and the blast of air, and then conducting the grain from the rethreshing cylinder.

The invention further consists in the idea of connecting the rethreshing cylinder with the threshing chamber, so that when the threshing chamber is moved, the other chamber is moved, and the movement of the threshing chamber in no wise affects the operation of the rethreshing chamber, as the conveyer is connected to both and continues to operate at all times when the cylinders in the threshing chamber are operating.

Another feature is in the fact that the raising and lowering features are controlled entirely from the driver's seat and the driver or operator has control over the direction of movement of the machine.

Having fully described our invention, what we claim as new and desire to secure by Letters Patent, is:

1. In a standing grain harvester, the combination with a traveling frame, of a casing mounted thereon, having a plurality of openings along one edge thereof, of independently operable vertical cylinders located adjacent to the openings, means carried by the cylinders for beating the grain from the standing stalks, and forcing the grain into the casing and means coöperating with the cylinders in removing the grain from the stalks.

2. In a standing grain harvester, the combination with a traveling frame, of a casing mounted thereon having a plurality of openings along one edge thereof, vertical cylinders located adjacent to the openings, dividers carried by the casing for feeding the stalks into the openings and obliquely to the cylinders, so that the grain can be removed, means carried by the cylinders for beating the grain from the standing stalks and forcing the grain into the casing and means coöperating with the cylinders in removing the grain from the stalks.

3. In a standing grain harvester, the combination with a traveling frame, of a casing mounted thereon having a plurality of openings along one edge thereof, vertical cylinders located adjacent to the openings, guides for feeding the stalks into the openings extending into the casing, and following the contour of the cylinders, so that the grain can be removed from the standing stalks, and means carried by the cylinders for beating the grain from the stalks and forcing the grain into the casing.

4. In a standing grain harvester, the combination with a traveling frame, of a casing mounted thereon having a plurality of openings along one edge thereof, vertical cylinders located adjacent to the openings, guides for feeding the stalks into the openings extending into the casing and following the contour of the cylinders, so that the grain can be removed from the standing stalks, and spirally arranged fingers connected to the cylinders extending over the openings for beating the grain from the stalks as the stalks are fed into the passages.

5. In a threshing harvester, the combination with a frame, of a casing mounted on the frame, independently operable vertical cylinders journaled in the casing, fingers mounted on the cylinders for beating the grain from the standing stalks and forcing the grain into the casing, and means in the casing for feeding the grain to the fingers whereby the grain can be whipped from the stalks.

6. In a threshing harvester, the combination with a frame, of a casing mounted on the frame, having a plurality of openings, independently operable vertical cylinders journaled in the casing located at one side of the openings, fingers mounted on the cylinders extending over the openings for beating the grain from the standing stalks and forcing the grain into the casing, means in the casing for feeding the grain to the fingers whereby the grain can be whipped from the stalks, and means for moving the casing to different elevations to accommodate the different heights of grain.

7. In a threshing harvester for removing the grain from standing stalks, the combination with a frame, of a casing mounted thereon having passages formed in the bottom thereof, a plurality of independently operable vertical cylinders journaled in the casing adjacent to the passages, horizontal fingers connected to the cylinders and projecting over the passages, means for guiding the standing stalks of grain into the passages and to the cylinders, so that the grain may be beaten from the stalks, and means for rotating the cylinders for causing the fingers to come in contact with the standing stalks and beat the grain from the stalks.

In testimony whereof we affix our signatures, in the presence of two witnesses.

NORMAN H. BEEBE.
WILLIAM A. THOMAS.

Witnesses:
 LEVI BOWERS,
 H. E. SMITH.